J. GREACEN, Jr.
Compressor for Nozzles for Hose, etc.
No. 122,719. Patented Jan. 16, 1872.
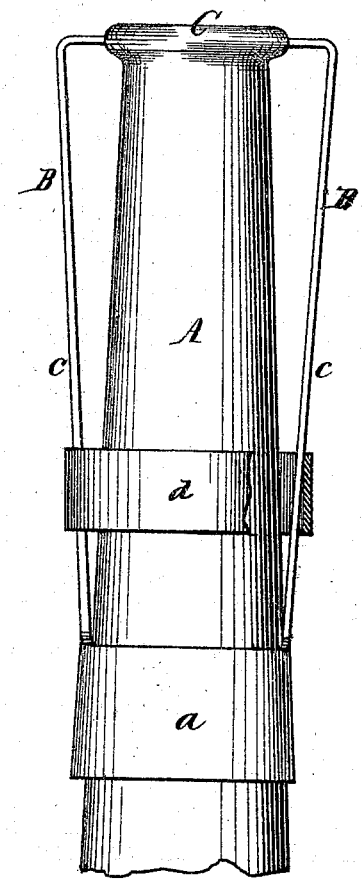
Witnesses.
Inventor.
John Greacen Jr.,
By Geo. W. Rothwell,
His Attorney.

122,719

UNITED STATES PATENT OFFICE.

JOHN GREACEN, JR., OF NEW YORK, N. Y.

IMPROVEMENT IN ELASTIC NOZZLES FOR HOSE.

Specification forming part of Letters Patent No. 122,719, dated January 16, 1872; antedated December 29, 1871.

*To all whom it may concern:*

Be it known that I, JOHN GREACEN, Jr., of the city, county, and State of New York, have invented a new and Improved Compresser for Elastic Nozzles, Hose, &c; and that the following is a full and exact description of the same, reference being had to the accompanying drawing and to the letters of reference marked thereon making a part of this specification.

The object of this invention is to construct an appliance to be attached to elastic nozzles, or play-pipes, or hose, so that the volume and shape of the stream issuing from the same may be regulated or entirely stopped. The invention consists in attaching to the end of elastic play-pipes, or nozzles, or hose, metallic fingers or clamps, so operated that when the terminal part of the play-pipe or hose is pressed together the orifice through which the water passes is squeezed more or less together.

In the accompanying sheet of drawings my invention is illustrated by a side view of the compresser applied.

A represents an elastic play-pipe or nozzle for hose. Fitted to said pipe is a metallic clamp or fingers, B, as shown, which may be constructed by being swaged out of sheet brass or other suitable material, the edges of the base *a* being brought together forming a ring of such size as will fit snugly around the pipe, and the fingers *c c* extended upward, the ends thereof being bent at right angles, or in any other manner, and resting against the edge of the terminal C. A slide or ring, *d*, is now passed over the clamp or fingers, so that when said slide is pushed upward it will force the ends of the fingers *c c* more or less together, and these in turn pressing the terminal will more or less close and change the shape of the orifice through which the water passes; or, if desired, shut off completely the exit of the water, acting in every respect as a valve or stop-cock, with the additional advantage of changing the shape of the orifice, thus enabling any one using a nozzle or hose with my invention applied thereto to use a full round or flattened stream, or even reduce the stream to spray.

I do not confine myself to merely sliding the ring on the fingers, as it may be screwed up and down by means of suitable threads formed on the ring and fingers.

I am aware that pipes have been constructed with devices for checking the flow of water by the operator at will, and that others have been so made that the flow ceases as soon as the pressure of the hand is removed, as when the pipe falls from the hand. I aim at neither of these effects, my purpose being to adjust the form and velocity, and, to a degree, the quantity of flow from a flexible nozzle, and at the same time to render a sudden cessation impossible, as the momentum of the flow may otherwise cause the pipe or nozzle to burst.

Having thus described my invention, what I claim as new, and desire to secure by Letters Patent, is—

The combination, in a compresser for yielding hose-nozzles, of fingers B *c* B *c* and a ring, *d*, fitted thereon, substantially as herein described.

JOHN GREACEN, JR.

Witnesses:
H. L. WATTENBERG,
RUFUS HOYT. (167)